C. C. CATTERLIN.
DIRECTION INDICATOR.
APPLICATION FILED DEC. 30, 1916.
1,260,640.
Patented Mar. 26, 1918.
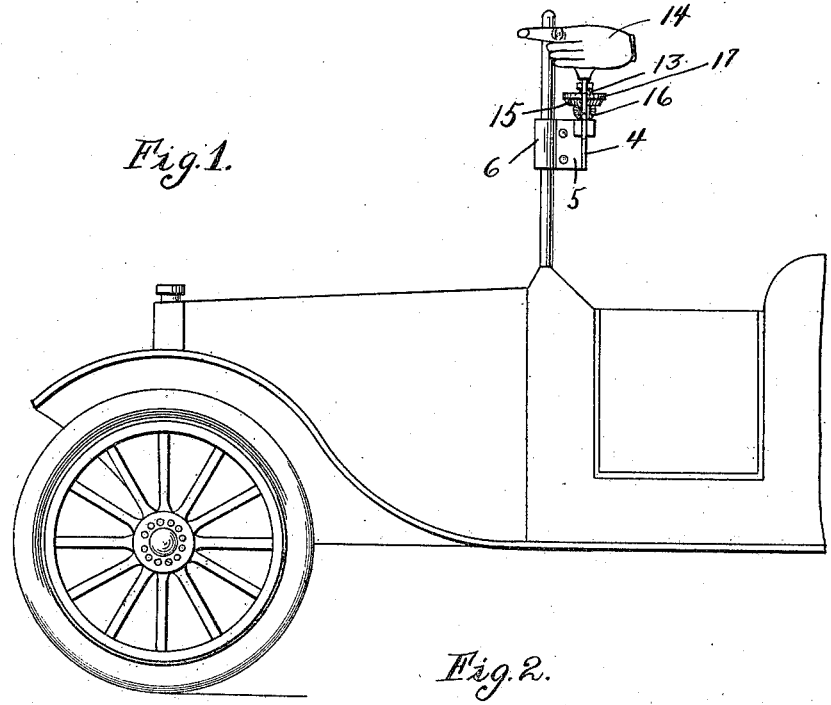
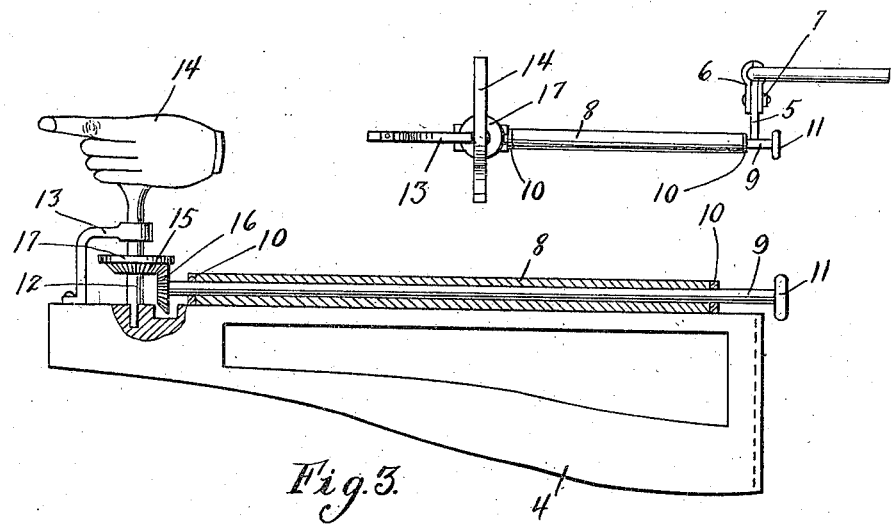
Witness
Arthur K. Moore
D. K. Galt
Inventor
Charles C. Catterlin
By Richard B. Owen,
Attorney

UNITED STATES PATENT OFFICE.

CHARLES C. CATTERLIN, OF WOODDALE, DELAWARE.

DIRECTION-INDICATOR.

1,260,640.  Specification of Letters Patent.  Patented Mar. 26, 1918.

Application filed December 30, 1916. Serial No. 139,804.

*To all whom it may concern:*

Be it known that I, CHARLES C. CATTERLIN, a citizen of the United States, residing at Wooddale, State of Delaware, have invented certain new and useful Improvements in Direction-Indicators, of which the following is a specification.

This invention relates to direction indicating mechanisms or signals, and is adapted particularly for use upon vehicles.

The primary object of the invention is to provide a signal of extremely simple and inexpensive construction, which may be quickly and easily attached to or detached from the vehicle, and which may be readily operated by the vehicle driver to apprise the occupants of other vehicles or pedestrians coming from any direction, which course he intends to take. A further object is to provide a device of this character which is adapted particularly to be attached to the wind shield or supporting frame therefor, so as to be within convenient reach of the vehicle operator. A still further object is to provide a device of this character which may be easily reversed, so as to be applicable to either side of the wind shield frame.

Still further objects reside in providing a signal mechanism of this character which is composed of but few inexpensive and readily assembled parts, so as to enable the device to be easily and cheaply manufactured, which has its parts so constructed and arranged as to minimize the opportunity for wear, breakage or derangement, which shall be positive in operation, and which will prove thoroughly efficient in the attainment of the ends for which it is designed.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1 is a fragmentary side elevation of a conventional form of motor vehicle, and illustrating the application of a signaling mechanism constructed in accordance with the invention;

Fig. 2 is an enlarged plan view of the device shown in Fig. 1; and

Fig. 3 is an enlarged rear elevation of the signal mechanism *per se*, removed from the vehicle, and portions being broken away to show more particularly the precise construction.

Referring now more particularly to the drawings, 4 indicates a frame which is constructed preferably of light but yet strong and durable metal, and which is adapted to be firmly attached to the wind shield supporting post of a motor vehicle. This frame has its rearmost end extending laterally at right angles, as indicated at 5, and to the outer extremity of which clamp members 6 are detachably secured. These clamp members engage around the vertical wind shield post, and when the securing elements shown at 7 are tightened, the said clamp members will firmly engage the post so as to hold the frame rigid thereto. It will also be observed that the frame is attached to the wind shield structure so as to project laterally beyond the said vehicle.

The upper horizontal edge of the frame 4 is provided with a longitudinally disposed barrel or bearing portion 8, within which is rotatably mounted a shaft 9, the latter being held against longitudinal movement therein by suitable collars or other abutments 10 as shown. The rear end of this shaft is equipped with a hand wheel 11, through the instrumentality of which the shaft may be readily rotated.

The vertically disposed stub shaft 12 is mounted at the outer end of the frame 4 and is supported adjacent its upper end by a bearing bracket 13. To the uppermost extremity of this shaft is rigidly secured an indicator, such as a hand or arrow 14, and which is the visual means for indicating the direction to be assumed by the vehicle. A beveled gear 15 is affixed to the vertical shaft 12, and a similar gear 16 is carried at the outer end of the shaft 9; the said gears being enmeshed with each other. It will also be observed that the gear 15 carries a plate 17, which projects beyond the periphery of the gear and overhangs the gear 16. This plate assists in maintaining the gears enmeshed.

In practice, the frame is applied to the wind shield post or any other fixed portion of the vehicle in the manner substantially as before stated. When the driver of the vehicle intends turning in one direction or the other, he rotates the shaft 9 by engaging and turning the handle 11. This action of the shaft will create rotation in the stub shaft 12, whereupon the signal or indicator 14 will be rotated. Proper manipulation of the hand wheel will point the indicator in the direction to be assumed by the vehicle. It will be observed that the shaft 12 is capable of rotating completely, and it is therefore apparent that the operator may very easily indicate that he is about to turn to the right or left.

While the present is a disclosure of what I believe to be the preferred embodiment of the invention, it is to be understood that the invention is not limited thereto, but that various changes may be made in the construction, arrangement, and proportion of parts, without departing from the spirit of the invention, as defined in the appended claim.

What is claimed is:—

In a device of the class described, a frame, a continuous bearing portion formed upon one edge of said frame, the ends of the said bearing portion terminating inwardly from the ends of said frame, a shaft rotatably mounted in said bearing portion, a right angularly disposed bracket carried by said frame at one end thereof, a bearing portion on said bracket, a stub shaft rotatably mounted in said bracket, intermeshing gears on said shaft and stub shaft, and an indicator on the outer end of said stub shaft.

In testimony whereof I affix my signature in presence of two witnesses.

CHARLES C. CATTERLIN.

Witnesses:
 CHARLES G. GUYER,
 S. E. BECKER.